Patented Apr. 8, 1930

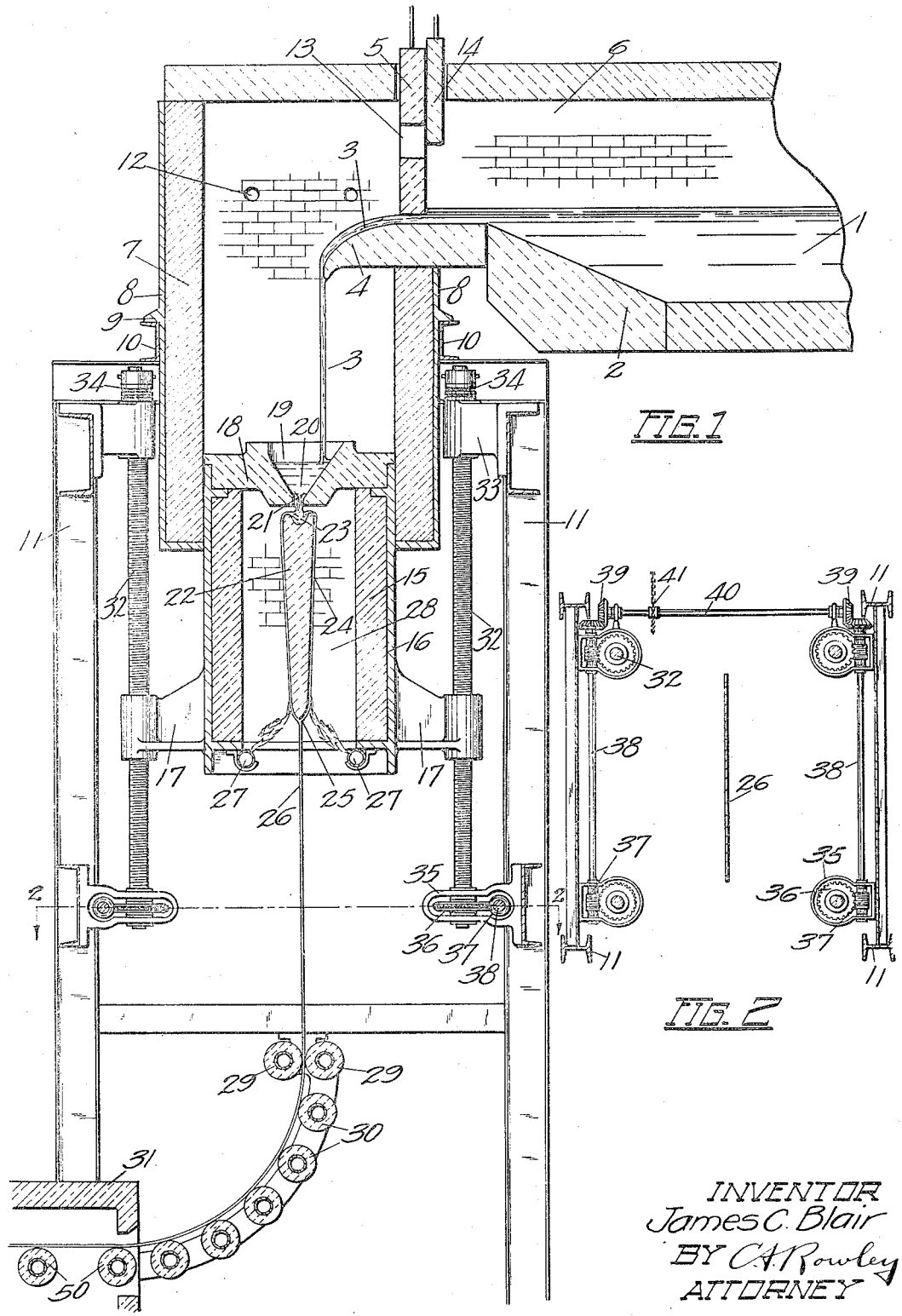

1,753,768

UNITED STATES PATENT OFFICE

JAMES C. BLAIR, OF TOLEDO, OHIO, ASSIGNOR TO LIBBEY-OWENS GLASS COMPANY, OF TOLEDO, OHIO, A CORPORATION OF OHIO

METHOD AND APPARATUS FOR FORMING SHEET GLASS

Application filed April 25, 1924. Serial No. 708,839.

This invention relates to the art of making sheet glass, and more particularly to an improved process and apparatus for drawing glass downwardly into sheet form.

Systems have been heretofore proposed in which molten glass is flowed downwardly onto and around a directing member or slab, from the lower edge of which the glass is continuously drawn down into sheet form. This glass sheet is suspended from the lower portion of the forming or directing slab, until substantially set in sheet form, and is then either supported between driven rollers for the remainder of its downward travel until severed into suitable sheet sections, or while still sufficiently plastic is deflected through an arc until it rests upon a suitable horizontal conveyor. The sheet drawing force depends upon the mass of glass directly suspended from the lower edge of the forming member, and in order to vary this drawing force to secure the proper drawing speed and desired thickness of sheet, it is necessary to vary the length or mass of this suspended portion of the glass sheet. This adjustment is ordinarily difficult to accomplish since the container for the molten glass is large and heavy and must have a substantially fixed relation to the glass-producing furnace, and it is also difficult and inconvenient to vary the location of the conveyor for the finished sheet.

According to the present invention means are provided for adjusting vertically the entire sheet-forming portion of the mechanism as a unit, without varying any of the sheet-forming conditions except the weight of the suspended portion of the sheet. More specifically, the sheet-forming slab, and a hopper or receptacle for catching the downwardly flowing stream of molten glass, are arranged in relatively fixed positions within an enclosing housing which is adjustable vertically through a rather long range of travel. This housing has telescopic connection with an upper fixed housing surrounding the downwardly flowing stream of molten glass, so that the molten stream and the sheet-forming mechanism are always completely enclosed and the temperature conditions therearound remain substantially constant. By adjusting this sheet-forming means vertically the mass of the suspended sheet is varied to secure the desired drawing force. At the same time the vertical fall of the stream of molten glass will be varied, but this is of no consequence since the stream is first caught in the distributing hopper, which will normally contain a small pool of the molten glass of substantially constant volume, the molten glass flowing from this pool at a constant rate onto and around the sheet-forming slab. The adjusting mechanism also provides an easy means for providing access to the distributing hopper and sheet-forming slab when it becomes necessary to repair or replace these parts.

The invention will be more clearly understood from the following detailed description of one approved form of the apparatus.

In the accompanying drawings:

Fig. 1 is a central vertical section through the apparatus.

Fig. 2 is a transverse section taken substantially on the line 2—2 of Fig. 1.

From the supply of molten glass 1 which is maintained in the extension 2 of the glass-forming tank or furnace, a shallow stream 3 is permitted to flow over the lip 4. The volume of this stream may be regulated as desired by adjusting vertically the gate or shear-cake 5. The molten glass 1 is enclosed by a housing 6, and a vertical housing 7 formed as a continuation of the housing 6 provides an enclosing heating chamber about the molten stream 3. The housing 7 is of considerable vertical extent as shown in Fig. 1, and is carried by an outer metallic casing 8, hung as at 9 from suitable horizontal beams or supports 10 carried by the vertical supporting beams 11. The temperature within housing 7 may be regulated by suitable burners such as 12, and also heated gases may pass into this chamber from the furnace, through openings 13 in gate 5, which may be opened or closed as desired by the secondary gate or shear-cake 14.

Vertically adjustable within the housing 7 and having a telescopic fit therewith is a second vertical housing 15 formed of suitable refractory material. This housing is enclosed and supported by a metallic casing 16 having supporting brackets 17 at its four lower corners. At the upper end of the housing 15 is mounted a refractory container or distributing member 18 having a hopper 19 with an open upper portion for catching the downwardly falling molten stream 3. Hopper 19 is adapted to contain a pool of molten glass 20, from which glass flows through the distributing slot 21 onto the upper end of the sheet-forming slab 22.

This slab 22 is substantially wedge-shaped, with a longitudinal recess 23 in its upper thicker edge portion for catching the glass flowing down through distributing slot 21. The molten glass in recess 23 overflows in thin films 24 down the opposite inwardly converging side portions of the slab, the flows 24 uniting at the lower edge 25 of the slab and being drawn away in the form of glass sheet 26. Suitable burners 27 have their flames directed against the glass films 24 to maintain the glass at the proper working temperature, and also to maintain the proper temperature in chamber 28 in housing 15.

Positioned a distance beneath slab 22 sufficient to allow the sheet 26 to become substantially set in sheet form, is a pair of preferably driven rollers 29 engaging the opposite faces of the sheet. These rollers may be driven at a speed to either add to the drawing force if turned slightly faster than the normal falling rate of the sheet, or to partially support the sheet if turned somewhat slower than this normal falling rate. Preferably, however, these rollers do not function as drawing means, but merely guide the sheet downwardly so as to maintain the suspended portion 26 of the sheet in the same vertical plane. Beyond the rollers 29 the still somewhat plastic sheet is deflected about a series of rollers 30 into a horizontal plane where it is carried away through leer 31 upon suitable conveying rollers, the first of which are indicated at 50.

Each supporting bracket 17, at one of the corners of the housing 15, has threaded connection with, and is supported by, a vertical screw 32 which is journaled at its upper end in a bearing 33 carried by the beams 11, the screw 32 being hung above bearing 33 by thrust bearing 34. The lower end of screw 32 is journaled in a bracket 35 suitably supported from the beams 11, and a worm wheel 36 keyed to the lower end of the screw meshes with a worm 37 keyed on horizontal shaft 38. There are two of these shafts 38, each carrying two of the worms 37, and the two shafts 38 are simultaneously driven through bevel gearing 39 from a cross-shaft 40 adapted to be driven in any approved manner, as by sprocket gearing 41. By suitably rotating the shaft 40 the screws 32 will be simultaneously rotated in such directions as to elevate or lower the housing 15, and the sheet-forming mechanism supported therein.

When housing 15 is elevated to its extreme upper position the molten stream 3 will flow almost directly into the hopper 19 without any great vertical fall, and the portion of glass sheet 26 suspended from the slab 22 will have its maximum mass. This will provide the greatest drawing force and a proportionately fast drawing rate for the sheet. The necessary flow of molten glass to supply this drawing rate may be provided by raising the gate or shear-cake 5. When housing 15 is lowered to such a position that its upper end just telescopes within the lower end of housing 7, the mass of the suspended sheet 26 will be at a minimum, and the drawing rate will be proportionately slow. At this time there will be a maximum fall of the molten stream 3 within the housing 7. However, this does not affect the drawing conditions as the fall of this glass is taken up by the hopper 19 and container 18, and since the pool 20 in the hopper is maintained at a substantially constant volume, the flow through distributing slot 21 to the slab 22 will be substantially constant regardless of the vertical adjustment of housing 15. It will be seen that by adjusting the housing 15 and the sheet-forming mechanism carried thereby to any desired position within the range of travel noted above, the mass of the suspended sheet 26 and consequently the sheet-drawing rate may be varied as desired without materially disturbing the temperature of the molten glass or any of the other conditions which affect the sheet-forming process.

The screws 32 are of such length that the housing 15 may be lowered completely out of the upper housing 7 so that the container 18 and slab 22 may be easily removed and replaced. At such time the stream of molten glass 3 will be cut off by lowering the slab 5 onto the overflow block 4.

Claims:

1. In apparatus for producing sheet glass, sheet-forming means for catching a stream of molten glass, distributing the glass into sheet form, and suspending a vertically hanging portion of the sheet, a supporting housing for the sheet-forming means, and means for adjusting the housing vertically.

2. In apparatus for producing sheet glass, sheet-forming means for catching a stream of molten glass, distributing the glass into sheet form, and suspending a vertically hanging portion of the sheet, a housing for the molten stream, and a housing for the sheet-forming means, the two housings having telescopic connection with one another, and means for adjusting the latter housing and the sheet-forming means vertically as a unit.

3. In apparatus for producing sheet glass, sheet-forming means for catching a stream of molten glass, distributing the glass into sheet form, and suspending a vertically hanging portion of the sheet, a supporting housing for the sheet-forming means, and a plurality of vertical screws for adjustably carrying the supporting housing.

4. In apparatus for producing sheet glass, a container for molten glass from which a stream of molten glass flows downwardly, a sheet-forming member, means for catching the molten stream and distributing it to the sheet-forming member, and means for adjusting the sheet-forming member vertically in a manner that the sheet drawing rate is accurately controlled.

5. In apparatus for producing sheet glass, a container for molten glass from which a stream of molten glass flows downwardly, a sheet-forming member, means for catching the molten stream and distributing it to the sheet-forming member, and means for adjusting the distributing means and the sheet-forming member vertically as a unit.

6. In apparatus for producing sheet glass, a container for molten glass from which a stream of molten glass flows downwardly, a sheet-forming member, means for catching the molten stream and distributing it to the sheet-forming member, a horizontal conveyor for supporting and carrying away the glass sheet, means for deflecting the suspended sheet onto the conveyor, and means for adjusting the sheet-forming member vertically in a manner that the sheet drawing rate can be accurately controlled.

7. In apparatus for producing sheet glass, a container for molten glass from which a stream of molten glass flows downwardly, a sheet-forming member, means for catching the molten stream and distributing it to the sheet-forming member, a horizontal conveyor for supporting and carrying away the glass sheet, means for deflecting the suspended sheet onto the conveyor, and means for adjusting the distributing means and the sheet-forming member vertically as a unit.

8. In apparatus for producing sheet glass, a container for molten glass from which a stream of molten glass flows downwardly, a sheet forming member, means arranged above said sheet forming member and spaced therefrom for catching the stream of molten glass and distributing it thereto, a housing enclosing the sheet forming member and supporting the distributing means upon the upper end thereof, and means for adjusting said housing, sheet forming member and distributing means vertically as a unit.

9. In apparatus for producing sheet glass, sheet forming means for catching a stream of molten glass, distributing the glass into sheet form, and suspending a vertically hanging portion of the sheet, means for supporting and guiding the suspended portion of said sheet, and means for adjusting the sheet forming means relative to said supporting means to control the drawing rate of said sheet.

10. In apparatus for producing sheet glass, a sheet forming member for catching a stream of molten glass, distributing the glass into sheet form, and suspending a vertically hanging portion of the sheet, a plurality of rotatable members for supporting the suspended portion of the sheet adjacent its lower end, and means for adjusting the sheet forming member vertically with respect to the rotatable members to vary the drawing rate of said sheet.

Signed at Toledo, in the county of Lucas, and State of Ohio, this 22d day of April, 1924.

JAMES C. BLAIR.